United States Patent
Haney et al.

(10) Patent No.: US 8,408,154 B2
(45) Date of Patent: Apr. 2, 2013

(54) STRAKES

(75) Inventors: James Allan Haney, Houston, TX (US); Cheng-Yo Chen, Houston, TX (US)

(73) Assignee: J. Ray McDermott, S.A., Houston, TX (US)

(*) Notice: Subject to any disclaimer, the term of this patent is extended or adjusted under 35 U.S.C. 154(b) by 974 days.

(21) Appl. No.: 11/702,349

(22) Filed: Feb. 5, 2007

(65) Prior Publication Data
US 2007/0209570 A1 Sep. 13, 2007

Related U.S. Application Data

(60) Provisional application No. 60/779,766, filed on Mar. 7, 2006.

(51) Int. Cl.
*F15D 1/10* (2006.01)
(52) U.S. Cl. .......... 114/243; 405/211; 405/216
(58) Field of Classification Search .......... 114/243, 114/264, 265, 266, 272, 274, 285; 405/195.1, 405/211, 216; 244/35 R, 198, 199.1, 199.2, 244/199.4
See application file for complete search history.

(56) References Cited

U.S. PATENT DOCUMENTS

| | | | | |
|---|---|---|---|---|
| 4,398,487 A | * | 8/1983 | Ortloff et al. | 114/243 |
| 5,102,068 A | * | 4/1992 | Gratzer | 244/35 R |
| 6,260,809 B1 | * | 7/2001 | Egolf et al. | 244/198 |
| 6,517,289 B1 | * | 2/2003 | Coakley et al. | 405/216 |
| 6,575,665 B2 | * | 6/2003 | Richter et al. | 405/195.1 |
| 6,953,308 B1 | * | 10/2005 | Horton | 405/211 |

* cited by examiner

*Primary Examiner* — Lars A Olson
(74) *Attorney, Agent, or Firm* — D. Neil LaHaye

(57) ABSTRACT

An improved strake for structures that are subject to vortex induced vibrations and motions due to fluid flow around the structure. One embodiment includes a streamliner on the edge of the strake. The streamliner may be added to existing strakes or may be formed at the same time as the strake for extruded strakes. The streamliner reduces vortex induced vibrations and motions of the structure to which the strake is attached. Another embodiment of the invention provides a tension resisting support attached to the strake and structure. The support provides a different load path along the strake than the previously known art for carrying the pressure loading from fluid pressure acting normal to the surface of the strake.

3 Claims, 8 Drawing Sheets

STRAKES

RELATED APPLICATIONS

This application claims and references the benefit of Provisional Application Ser. No. 60/779,766 filed on Mar. 7, 2006.

FIELD AND BACKGROUND OF INVENTION

The invention is generally related to the reduction of vortex induced vibrations or motions in a structure due to fluid flow around the structure and more particularly to the reduction of such vibration or motions through the use of strakes on the structure.

Vortexes are formed in a fluid, when the fluid passes around an object. Under the right conditions, a succession of vortexes can be formed that alternate from side to side of the object. The alternating vortexes produce a pressure variation that alternates from side to side of the object. The alternating pressure variation creates an alternating force on the object in a direction transverse to the flow of the fluid. The period of the alternating force could be resonant with the natural period of the object. Then resonance can damage or destroy the object. Resonance might destroy the object by producing forces strong enough to overload the object, or resonance might produce cyclical loadings that fatigue the material of the object and cause failure over a longer time. Many commercially important objects have been damaged or destroyed by what has come to be known as, "Vortex Induced Vibration", or VIV.

Almost any object in a stream of fluid might be affected by VIV. Most commonly affected are cylindrical structures, or cylindrical elements of structures. Normally, the fluid is air in the onshore environment, and water in the offshore environment. Some examples of structures that often have VIV related problems are smokestacks, vertical vessels, and elements of truss structures. In the offshore environment in water some examples of structures that often have VIV related problems are risers, TLP tendons, mooring lines, and elements of truss structures. Risers and TLP tendons are pipes that extend from the mudline to the vicinity of the water surface, usually under high tension. They act like giant violin strings plucked by alternating vortexes.

VIV can affect structures of all sizes. One of the largest structures that has a demonstrated response to vortexes is the offshore spar buoy. A spar buoy has a large diameter vertical cylinder moored in the ocean, so that the ocean currents produce vortexes that cause the entire structure to move cyclically, transversely to the current. This motion does not harm the spar itself, but it can overload or fatigue the elements attached to the spar, such as the mooring system, and the risers. This cyclical motion is often called "Vortex Induced Motion", or VIM. In the case of VIM the whole object moves cyclically as a rigid body, whereas in VIV the object is distorting and vibrating.

There are two general approaches to eliminating or minimizing problems related to VIV or VIM. One approach is to change the period of the structure so that the structural period is no longer resonant with the expected vortex shedding periods. Usually, the structural periods are reduced by making the structure, or its elements, stiffer. Alternately, the structural periods can be increased by adding mass in selected locations to avoid resonance. The second approach is to avoid resonance by affecting the formation of the vortexes.

A method for affecting the formation of vortexes is to install "strakes" on the surface of the structure, or some of its elements. Refer to FIG. 1, which shows three strakes 1 wound in a spiral pattern around a cylinder 2. At any given point along the axis of the cylinder 2, the strake 1 extends radially outward from its contact with the surface of the cylinder 2. If three strakes 1 appear in a cross section through the cylinder 2, in the jargon of the trade, it is said that there are three starts. Sometimes four starts are used, as in FIG. 2. Any number of starts might be used. The "rise" of a strake is the distance it travels along the axis of the cylinder during a full revolution around the cylinder. The "pitch" of a strake is the rise divided by the circumference of the cylinder. The radial projection of the strake from the wall of the cylinder to its tip is most often called the "width" of the strake. The strake width divided by the diameter of the cylinder is an important design variable and is often called the "ratio" and is usually expressed as a percentage.

In a strake design the most important variables include the number of starts, the pitch, and the ratio. In important new designs of strake systems the design is normally confirmed by empirical testing. The ratio tends to vary from 10% to 15% and three starts are most common. The strake is normally made from flat plate that is cut and twisted so that it runs up the spiral and is welded in place. A radial section through a typical strake is shown in FIG. 3. On smaller cylinders the strake is not very wide, so it can be extruded out of plastic and bonded to the cylinder. However, when strakes are applied to large cylinders in water a significant structural strength problem asserts itself. Because the cylinder is large, the strake must be wide. The water exerts large pressures normal to the surface of the strake. The pressure is caused by the action of the waves, the ocean current, and the motion (if the strake is attached to a floating body) of the structure. The strakes must be designed to resist these pressures.

FIG. 4 gives an example of a wide strake that was designed to fit on a large diameter cylinder, moored in the ocean. The simple one plate design of smaller strakes has been abandoned in favor of a stiffened two plate arrangement that allows the strake to resist the applied pressure as a cantilever. The strake shown was about 10 feet wide. FIG. 5 shows an existing design for an even wider strake. This strake is about twenty feet wide. Again, the design develops sufficient strength for the strake to act as a cantilever. Since these strakes were not the typical flat plate strakes, it was thought the strakes might behave differently than predicted by empirical formulae that were developed using single flat plate strake designs. However, testing indicated that these strakes behaved about as predicted. But the newer, stronger designs indicated in FIG. 4 and FIG. 5 did have some disadvantages.

The strake plates 3 forming the surface of the strake in FIG. 4 and FIG. 5 are continuous plates spiraling around the cylinder. These two strake plates 3 support each other and develop the strength of the strake as a cantilever. However, to resist the pressure exerted by the water the two strake plates must be supported locally by stiffener plates 4, which are placed inside the volume enclosed by the strake plates. There are other stiffener plates in the enclosed volume that are not shown for reasons of simplicity. The stiffener plates are placed inside the enclosed volume to reduce the fluid drag that would act on the stiffeners if they were placed on the outside. As can be imagined by studying FIG. 4 and FIG. 5, these strakes are heavy, difficult to build, and expensive. First, men must enter the enclosed volumes to do the necessary fitup and welding of the stiffeners. Second, the fabrication and twisting and fitup of the strake plates 3 is difficult and time consuming.

SUMMARY OF THE INVENTION

The present invention addresses the deficiencies in the known art with two approaches. One approach provides a feature that can be used when building new strakes for a structure or added to an existing strake design. A streamliner is added to the tip of the strake and preferably runs the full length of the strake. The shape of the streamliner may be circular, tear drop, or other shapes. Another approach applies to wider strakes and provides tension resisting supports that are capable of resisting tension in the spiral direction.

The various features of novelty which characterize the invention are pointed out with particularity in the claims annexed to and forming part of this disclosure. For a better understanding of the present invention, and the operating advantages attained by its use, reference is made to the accompanying drawings and descriptive matter, forming a part of this disclosure, in which a preferred embodiment of the invention is illustrated.

BRIEF DESCRIPTION OF THE DRAWINGS

In the accompanying drawings, forming a part of this specification, and in which reference numerals shown in the drawings designate like or corresponding parts throughout the same.

DESCRIPTION OF THE PREFERRED EMBODIMENTS

Figure 6:
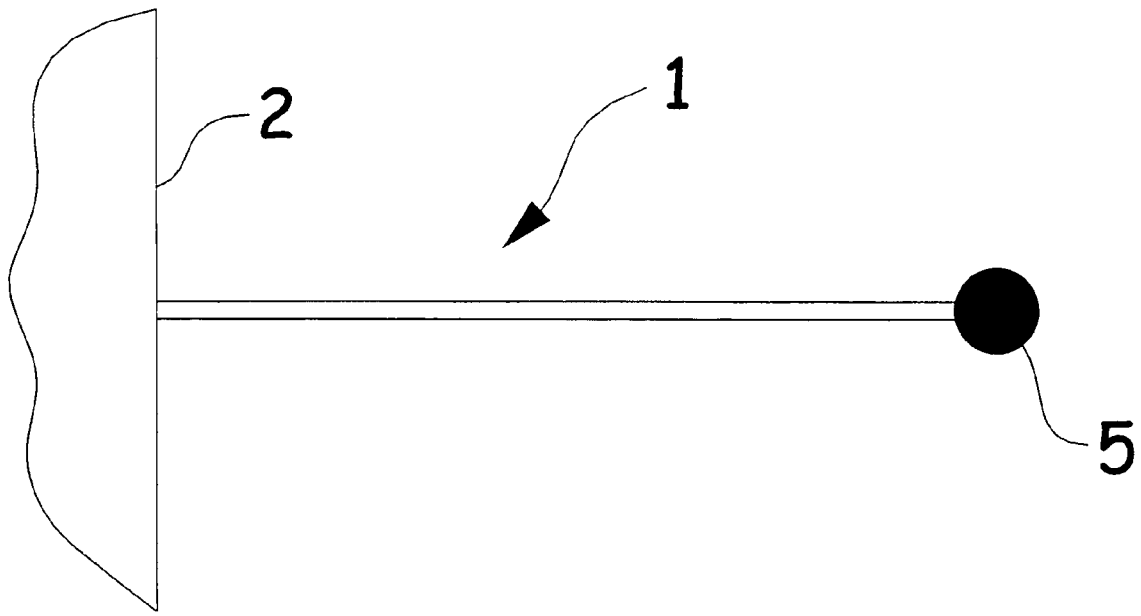
FIG. 6 is a sectional view of the invention.
Figure 7:
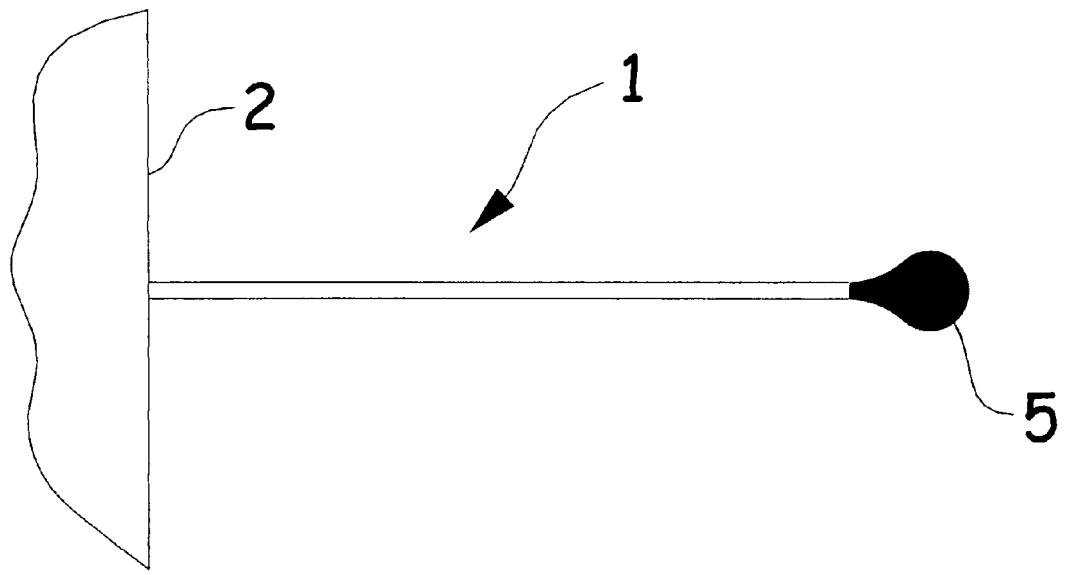
FIG. 7 is a sectional view of another embodiment of the invention.

One embodiment of the invention is generally indicated by numeral 5 in FIGS. 6 and 7. It is seen that the streamliner 5 generally comprises an enlarged tip on the strake 1. The enlarged tip may be circular or tear drop in shape, or another shape if desired.

The streamliner 5 may be added to existing strakes or may be formed as part of the strake at the time it is formed. Strakes formed of plastic may be extruded to include the streamliner 5. Metal strakes may have the streamliner 5 added. The streamliner 5 may be comprised of a pipe or other items having a circular or tear drop cross section that is rigidly attached to the strake 1.

The streamliner 5 is preferably attached along the full length of the strake 1 but may also be terminated at any point along the strake 1 where desired. The streamliner 5 also acts to stiffen the tip, or free edge, of the strake 1 and to prevent fluttering of the edge, and to develop additional tension along the free edge of the strake.

Figure 8:
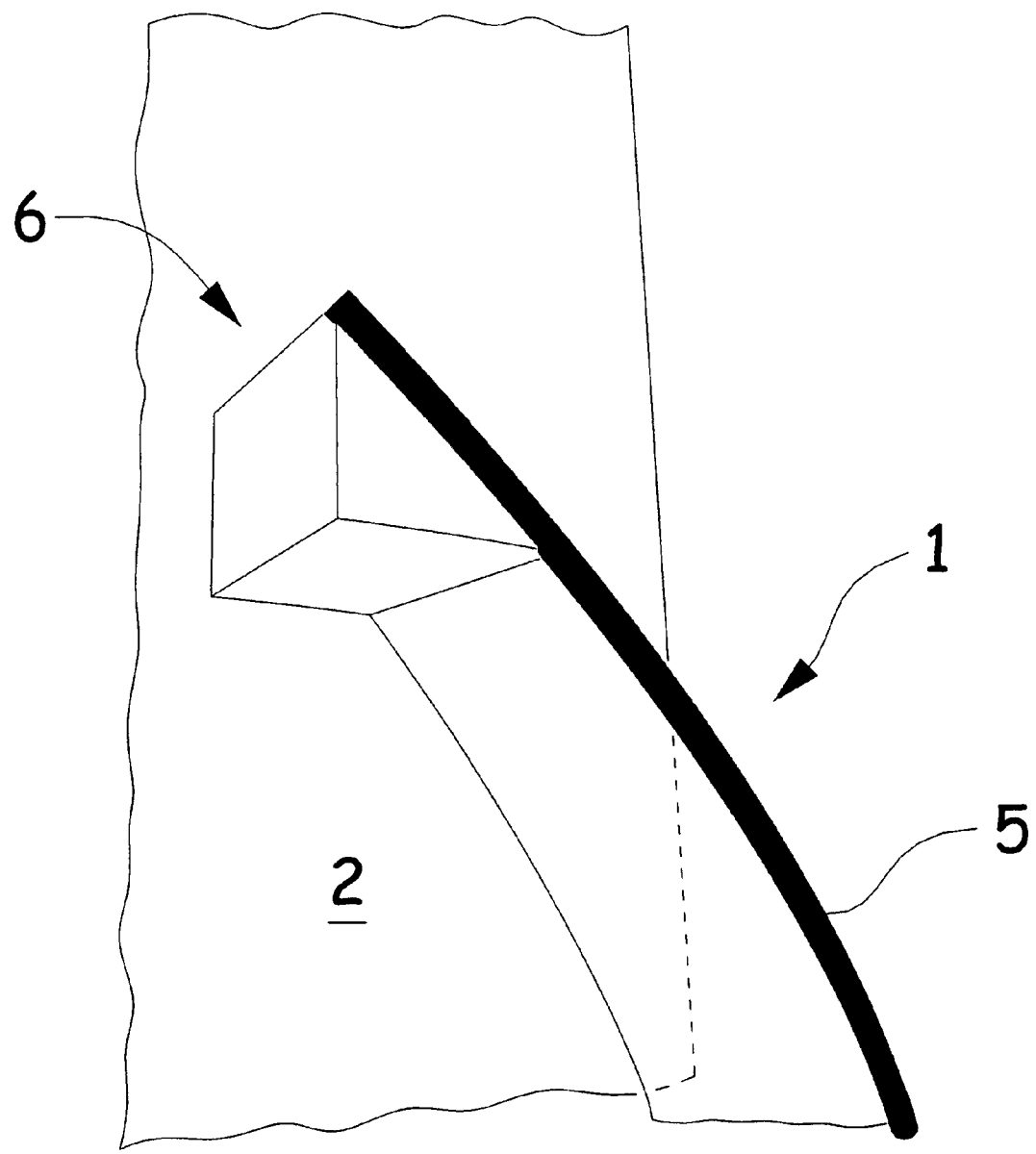
FIG. 8 is a view taken along lines 8-8 in FIG. 1 and illustrates another embodiment of the invention.

Another embodiment of the invention is illustrated in FIG. 8. A tension resisting support 6 is rigidly attached to the strake 1 and cylinder 2 at each end of the strake 1. The tension resisting support 6 comprises a rigid block attached to the cylinder 2 and the strake 1 at each end of the strake 1. Depending on the design, one or more tension resisting supports 6 may be provided at intermediate points along the length of the strake 1. The spiral length of a strake 1 at any radius from the cylindrical axis is the minimum length possible. When the strake plate is pushed out of its ideal surface by pressure acting normal to its surface, the strake 1 is stretched, which creates tension in the spiral direction, provided there are supports capable of resisting tension in the spiral direction. The spiral tension provides the means to resist the pressure loadings acting normal to the surface of the strake 1. Therefore, the tension resisting support 6 provides a different load path than the prior art for carrying the pressure loading, namely a tension field instead of a cantilever.

Depending on the application, the tension resisting support 6 may be used alone or in combination with the strake streamliner 5.

The invention provides several advantages. Weight and cost are reduced. The strake is much easier to fabricate because it is a single strake with no enclosed stiffeners. Many designs will require only the strake streamliner as the stiffener. On cylindrical shaped objects with a large diameter that require wide strake plates, the invention will reduce the weight of the strakes by about half and make the strake easier to fabricate primarily because it is a single strake plate normal to the cylinder. The geometry and construction is simple compared to the cantilevered designs of the prior art.

Figure 1:
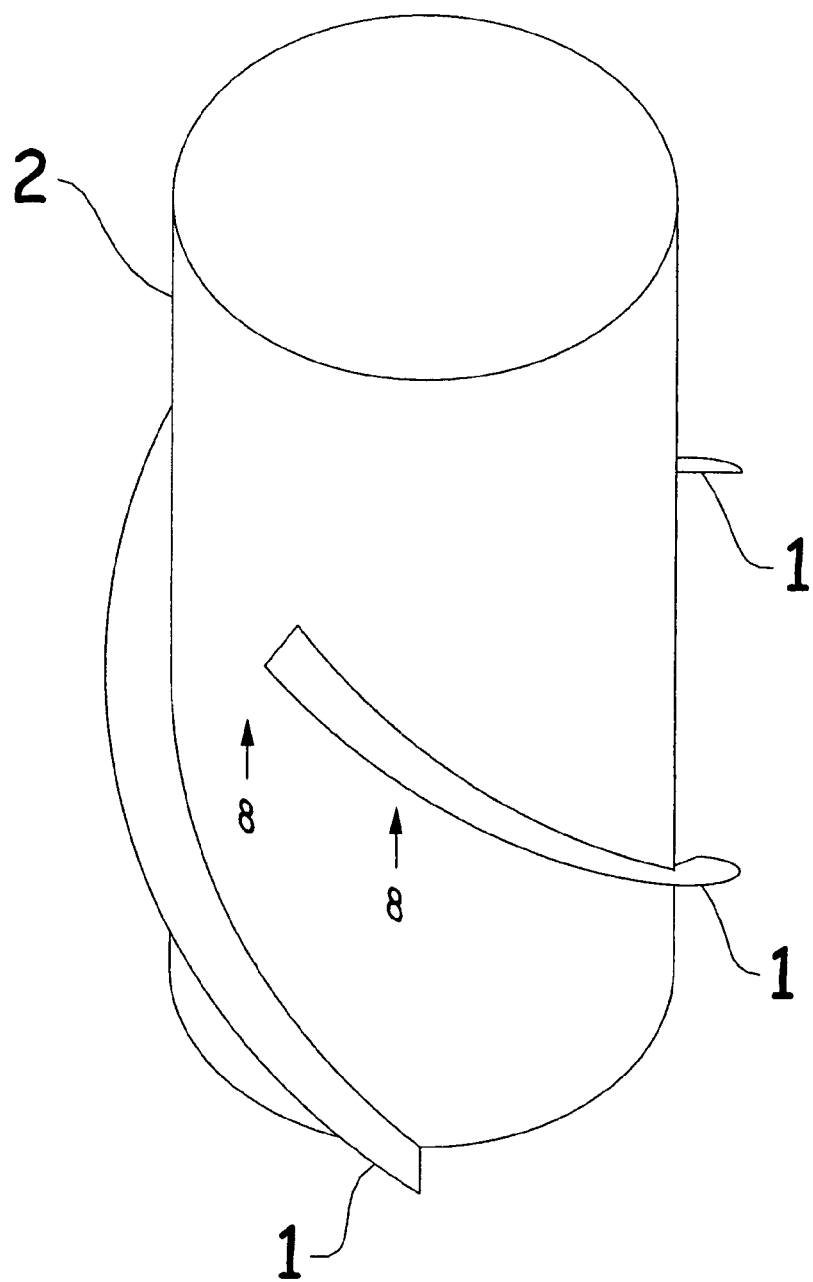
FIG. 1 illustrates a prior art strake arrangement with three starts.
Figure 2:
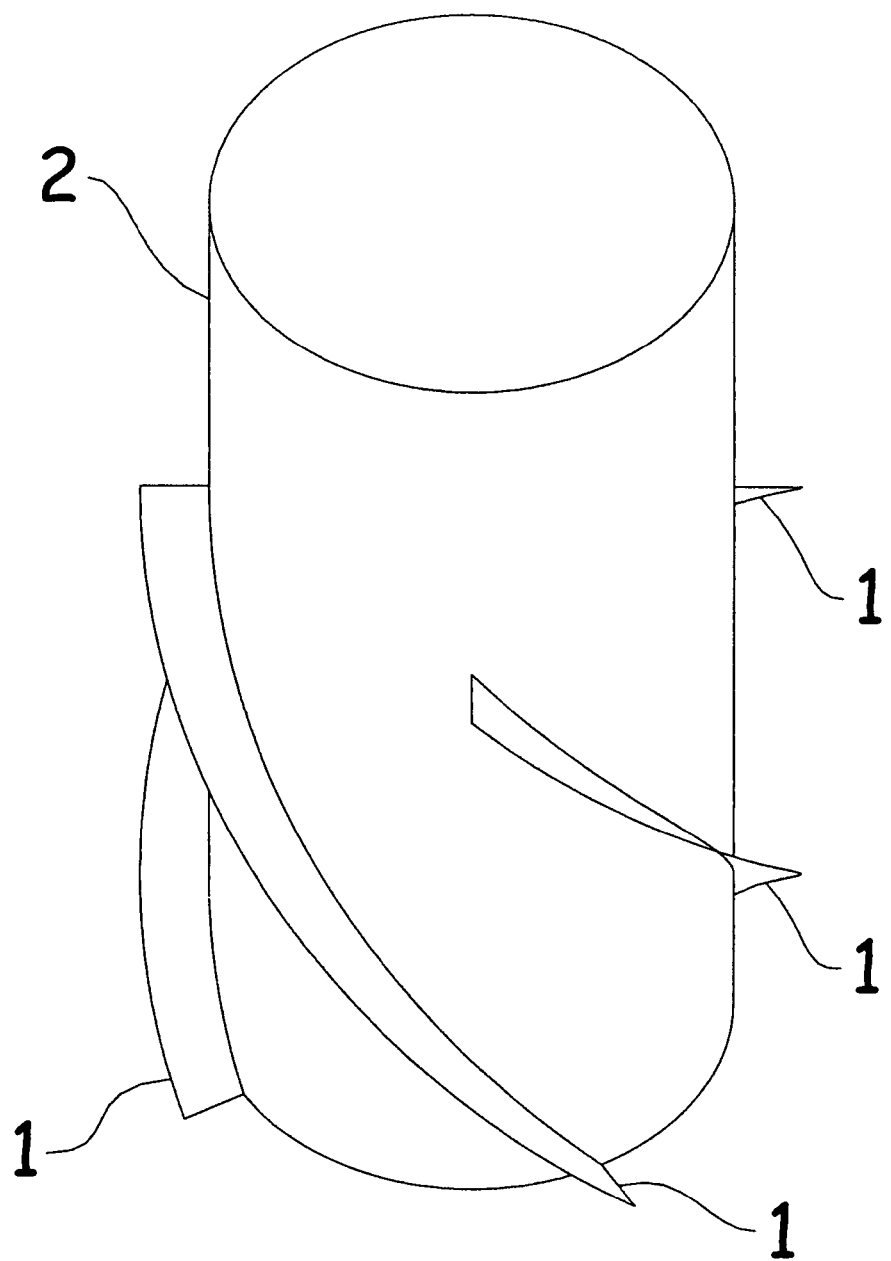
FIG. 2 illustrates a prior art strake arrangement with four starts.
Figure 3:
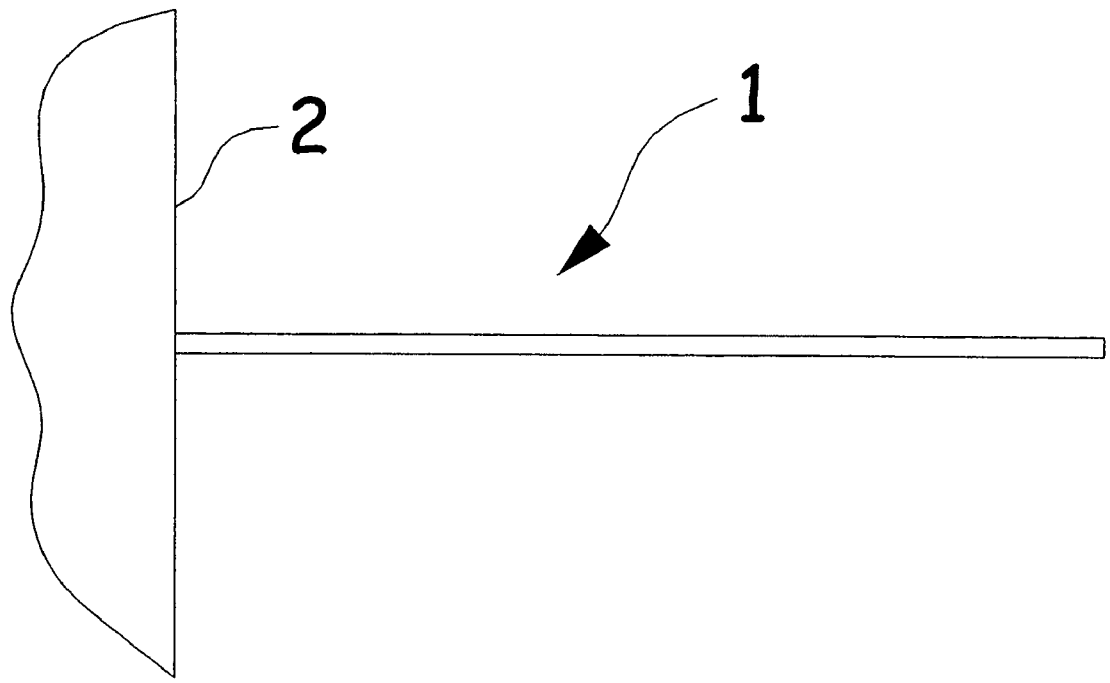
FIG. 3 is a sectional view of a prior art strake.
Figure 4:
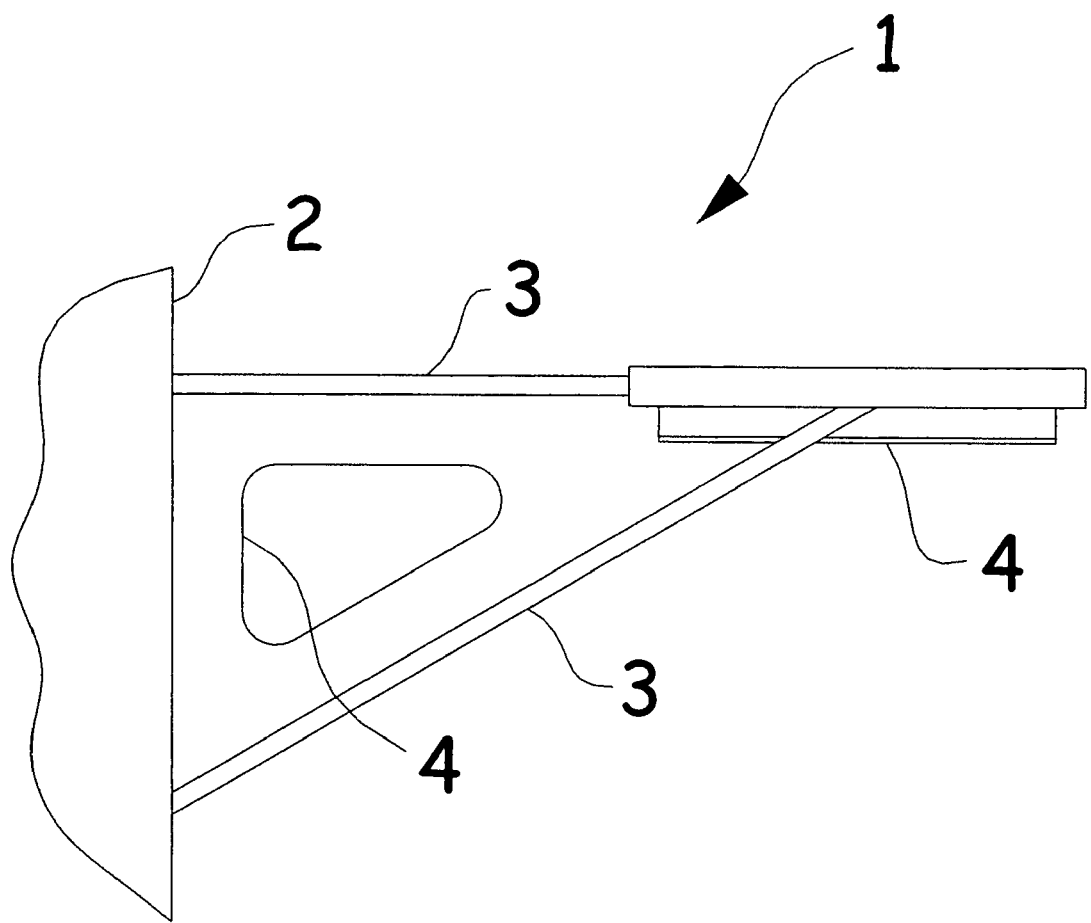
FIG. 4 is a sectional view of a prior art strake.
Figure 5:
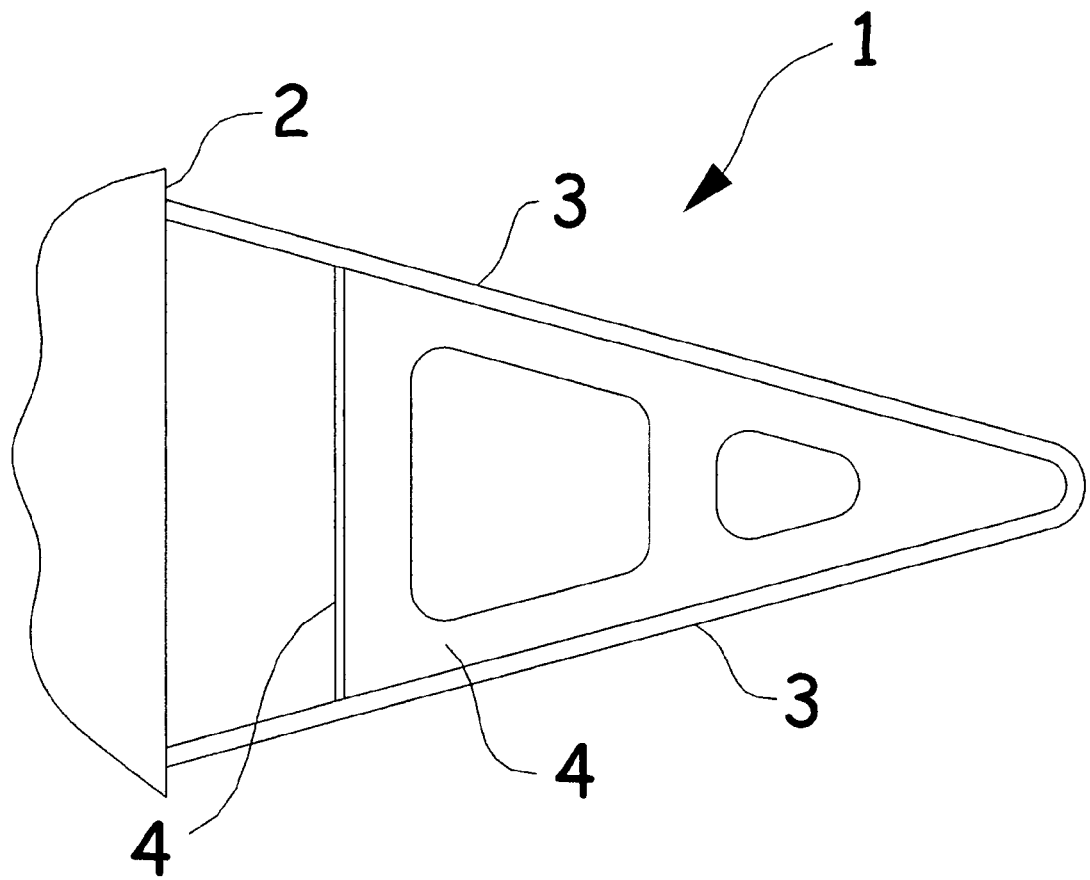
FIG. 5 is a sectional view of a prior art strake.

The invention is applicable to all types of fluid flow around structures, including air and liquid. Also, while the drawings only illustrate the streamliner 5 attached to a flat strake, it should also be understood that the streamliner 5 may also be attached to a cantilever strake such as that illustrated in FIGS. 4 and 5.

While specific embodiments and/or details of the invention have been shown and described above to illustrate the application of the principles of the invention, it is understood that this invention may be embodied as more fully described in the claims, or as otherwise known by those skilled in the art (including any and all equivalents), without departing from such principles.

We claim:

1. A tension resisting support for a spiral strake on a cylindrical structure, comprising a rigid block attached to each end of the strake and the cylindrical structure, such that distortions of the strake normal to the surface of the strake stretch the strake against the tension resisting support, thereby inducing tension in the strake in the spiral direction.

2. A tension resisting support for a spiral strake on a cylindrical structure, comprising a rigid block attached to the strake at each end, and at least one position between the ends of the strake, and the cylindrical structure, such that distortions of the strake normal to the surface of the strake stretch the strake against the tension resisting support, thereby inducing tension in the strake in the spiral direction.

3. A tension resisting support for a spiral strake on a cylindrical structure, comprising:
   a. a tension resisting element attached to the tip of the strake; and
   b. a rigid block attached to each end of the strake, the tension resisting element, and the cylindrical structure, such that distortions of the strake normal to the surface of the strake stretch the strake against the tension resisting support, thereby inducing tension in the strake in the spiral direction.

* * * * *